United States Patent [19]

Chevalet et al.

[11] Patent Number: 4,590,6(

[45] Date of Patent: May 20, 19

[54] SYSTEM FOR THE ACQUISITION OF DATA INSCRIBED ON A SUPPORT

[75] Inventors: Jean Chevalet, Paris; Robert Reeves, Montigny le Bretonneux, both of France

[73] Assignee: Centre National de la Recherche Scientifique, Paris, France

[21] Appl. No.: 498,570

[22] Filed: May 26, 1983

[30] Foreign Application Priority Data

Jun. 4, 1982 [FR] France ............... 82 09749

[51] Int. Cl.[4] .................................. G06K 9/38
[52] U.S. Cl. ....................... 382/50; 250/209; 358/174; 382/52; 382/60
[58] Field of Search ............... 382/50-53, 382/60; 250/209, 227; 358/174, 282

[56] References Cited

U.S. PATENT DOCUMENTS

| 3,820,068 | 6/1974 | McMillin | 382/52 |
| 3,845,319 | 10/1974 | Walter | 250/209 |
| 3,852,590 | 12/1974 | Brouwer | 250/202 |
| 3,859,520 | 1/1975 | Hertzberg et al. | 250/209 |
| 3,872,434 | 3/1975 | Duvall et al. | 382/50 |
| 3,911,212 | 10/1975 | Yoshizawa et al. | 382/52 |
| 4,149,143 | 4/1979 | Nagano et al. | 382, |
| 4,157,533 | 6/1979 | Du Vall | 382, |
| 4,468,704 | 8/1984 | Stoffel et al. | 382, |
| 4,500,204 | 2/1985 | Ogura | 250/: |

OTHER PUBLICATIONS

Proceedings of the Nal. Electr. Conf., vol. 35, O 1981, Oak Brook, Ill. pp. 483-486.
Review of Scientific Instruments, vol. 51, No. 7, J 1980, New York; R. M. Lum et al; pp. 954-958.

*Primary Examiner*—Leo H. Boudreau
*Assistant Examiner*—Joseph Mancoso
*Attorney, Agent, or Firm*—Oblon, Fisher, Spivak, McClelland & Maier

[57] ABSTRACT

The present invention relates to a system for the acqui tion of data inscribed on a support. It more particula applies to the acquisition of graphic data, such as ch acters, curves or all types of lines present on a reflecti or transparent support, whereby said data are mor chromatic or polychromatic. The system according the invention makes it possible to digitize graphic d: on a support. It can also permit the acquisition of data photometry, densitometry, and so forth.

19 Claims, 13 Drawing Figures

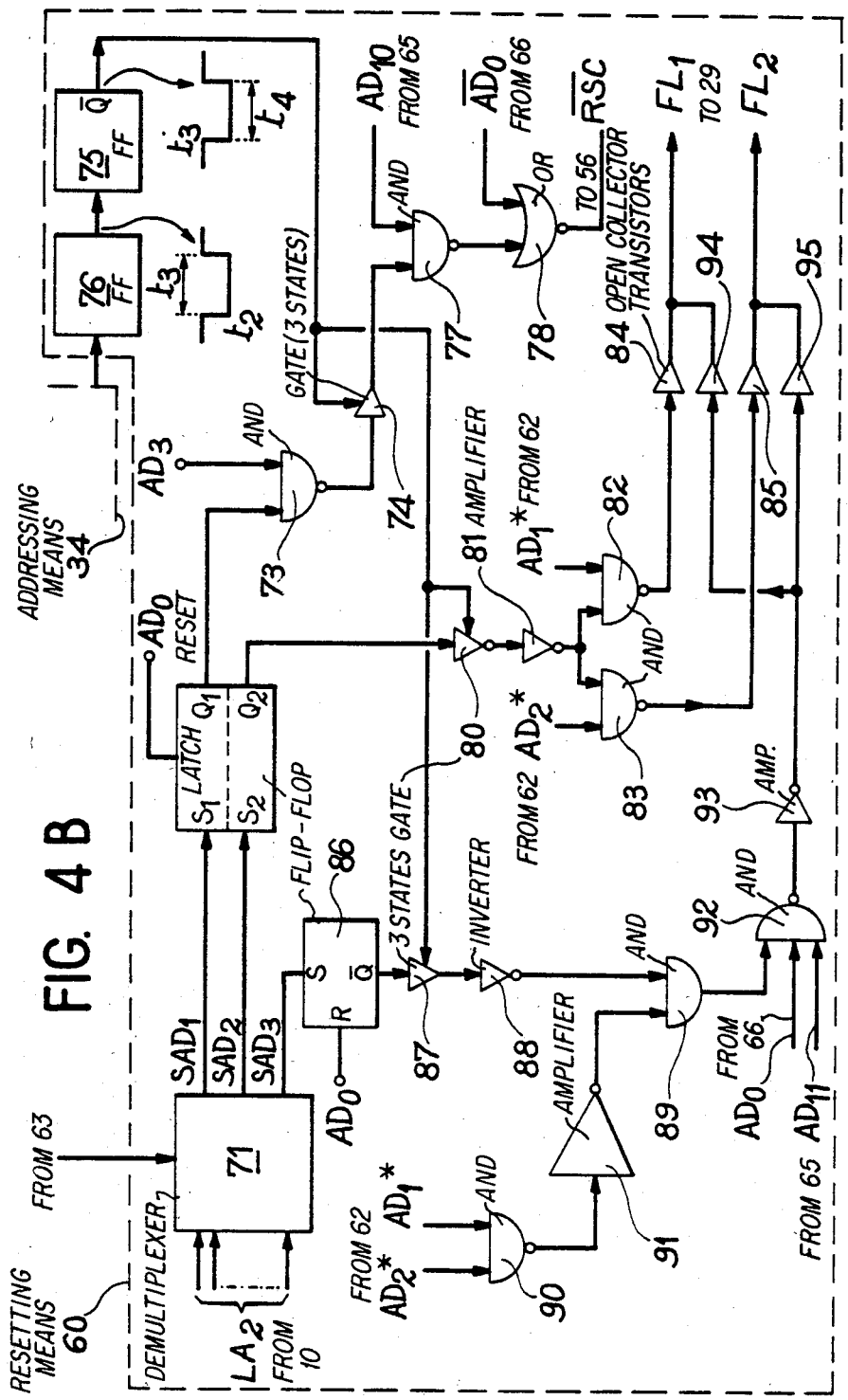

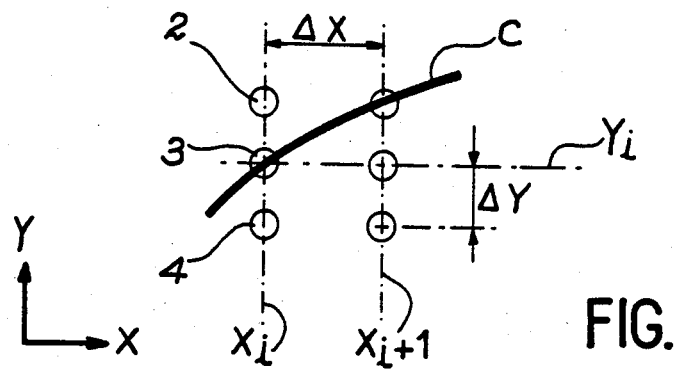
FIG. 6
FIG. 7
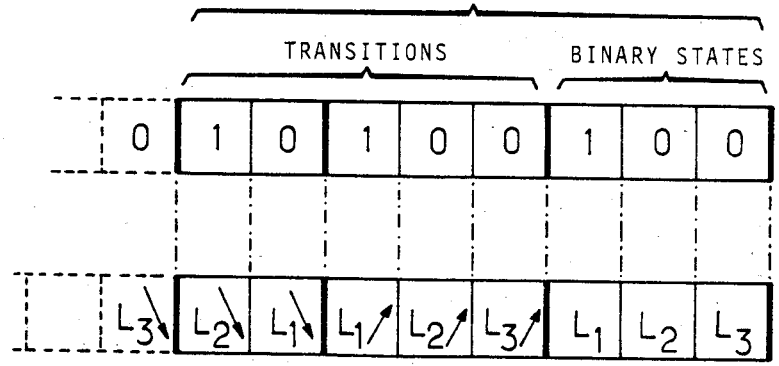
FIG. 8

SYSTEM FOR THE ACQUISITION OF DATA INSCRIBED ON A SUPPORT

BACKGROUND OF THE INVENTION

The present invention relates to a system for the acquisition of data inscribed on a support. It more particularly applies to the acquisition of graphic data, such as characters, curves or all types of lines present on a reflecting or transparent support, whereby said data are monochromatic or polychromatic. The system according to the invention makes it possible to digitize graphic data on a support. It can also permit the acquisition of data in photometry, densitometry, etc.

The known system permitting the acquisition and digitization of graphic data can be placed in two categories. Systems of the television camera type can be placed in a first category. These systems function by scanning the zone containing the data to be acquired. They generally comprise a digitization system connected to the scanning circuit of the camera. Their resolution is not very high. The systems of the second category comprise a "pen" making it possible to point or prick data of a design disposed on a table having a matrix of wires or any other system making it possible to cross-rule the zone containing the graphic data to be acquired. Their coordinates are obtained from electromagnetic field variations caused in the matrix of wires by the pointer. Under human control, said coordinates are then transferred to a computer.

In the case of systems of this second category, the digitization of the graphic data is not automatic and can involve considerable errors, due e.g. to the parallax of the pointing or pricking by means of the pen. Moreover, with such systems, the acquisition of graphic data takes a long time, is difficult and is also expensive. Systems of the second category are unable to supply numerical data relating to the intensities of electromagnetic radiation emitter by the data to be acquired.

SUMMARY OF THE INVENTION

The object of the present invention is to obviate these disadvantages and in particular to provide a graphic data acquisition system making it possible to acquire and digitize monochromic or polychromic data in an automatic manner, with a high degree of precision and not only at the locations of said data in a given area, but also on the intensities of the electromagnetic radiation emitted by the data. The invention also relates to a graphic data acquisition system having a very good resolution.

The invention therefore relates to a system for the acquisition of data inscribed on a support incorporating detection means sensitive to the different electromagnetic radiation intensities of predetermined wavelengths, coming from data inscribed on a support, said detection means supplying on outputs, analog signals whose amplitudes are respectively dependent on the radiation intensities, means for displacing the detection means at least in an area containing the data to be acquired, control and processing means comprising a processor connected to the means for displacing the detection means and to a memory, analog-digital conversion means receiving the analog signals during the displacement of the detection means in order to supply at an output digital values corresponding respectively to the said amplitudes, the memory containing control instructions for the means for displacing the detection means relative to a fixed coordinate, as well as processing ar addressing instructions for the digital values related the coordinates of the data. The analog—digital conve sion means comprise an analog—digital converter an programmable means for the amplification of the ampl tudes of the analog signal supplied to the analog-digit converter. This amplification is performed on the bas of a predetermined reference amplification amplitud the gain of said amplification means being programm; ble by the processor and dependent on a desired scale of digital values at the output of the analog-digital coi verter. The system also comprises comparison mear with logic outputs for comparing the instantaneou values of these amplitudes of the analog signals wit mean reference comparison amplitude values during th displacement of the detection means of the states c logic state changes of the signal supplied by the outpui of said comparison means, said states or state change representing instantaneous transitions of the intensity c radiation caused by the acquisition of the data by th detection means during their displacements.

According to another feature of the invention, th detection means comprise at least one median photoser sitive cell and two photosensitive cells on either side c the median cell, the amplification reference and com parison reference amplitudes being determined during displacement of the detection means, permitting a prio scanning of the zone containing the data to be acquired According to another feature of the invention, th detection means also comprise output amplifiers, th inputs of these amplifiers being respectively connecte to the outputs of the cells, whilst outputs of these ampli fiers respectively supply the analog signals.

According to another feature of the invention, th programmable amplification means comprise an analo; multiplexer having inputs respectively connected to th outputs of the output amplifiers, one input of an analo; comparator receiving a signal having said predetei mined amplification reference amplitude, whilst anothe input of said comparator receives the analog signal supplied by the output amplifier of the median cell dur ing displacements in the said zone, an amplifier havin; a programmable gain determined by the processor, ai input of said amplifier being connected to an output o the analog comparator, an output of said comparato being connected to an input of the multiplexer to switcl the amplified signals corresponding to the median cel to the analog-digital converter.

According to another feature of the invention, th mean reference amplification amplitude is determine( by the processor from the amplitudes of the analo; signals supplied by the output amplifier, which corre sponds to the median photosensitive cell, during prio scanning.

According to another feature of the invention, th mean reference comparison amplitudes are respectivel; determined by the processor from the amplitudes o signals respectively supplied by the output amplifier during prior scanning.

According to another feature of the invention, th comparison means with logic outputs comprise, fo each output amplifier, a digital-analog converter receiv ing on an input a reference digital comparison valu supplied by the processor, said digital value corre sponding to the mean reference comparison amplitude for the analog signal supplied by the correspondin; output amplifier, a comparator having two inputs, on put of said comparator being connected to the output the corresponding digital-analog converter for receiving an analog signal, whose amplitude corresponds the reference digital comparison value, another input this comparator being connected to the output of the corresponding output amplifier, each comparator supplying on one output, a logic signal having two states presenting the characteristic states of the intensities of e radiation emitted by the graphic data and detected the corresponding cell, said states being detected iring the acquisition of data and respectively indicating whether the amplitude of the signal supplied by the itput amplifier of said cell is higher or lower than the ference mean comparison amplitude for eaid cell.

According to another feature of the invention, the stem also comprises coding means having inputs connected to the outputs of the comparators for forming, iring the acquisition of the data, words representing e instantaneous binary states of the outputs of the imparators and making it possible to mark the outputs the comparators, whose signals undergo a binary ate change, said words being supplied to the processor the outputs of the coding means.

Accoding to another feature of the invention, the iding means comprise at least one register, the outputs this register forming the outputs of the coding means, puts of this register being connected to the outputs of the comparators, and three bistable latches respectively iving two control inputs, the intputs of the first second id third of the said latches being respectively connected to the outputs of the first and second comparators, the first and third comparators, and the second and ird comparators from among the three comparators of e comparison means.

According to another feature of the invention, the stem also comprises at least one counter having an put connected to the output of the second comparator irresponding to the median cell for counting the number of logic state changes undergone by the output gnal of said comparator during the acquisition of the ita or during the prior scanning.

According to another feature of the invention, the utputs of the counter are connected to the processor y means of a register.

According to another feature of the invention, the stem also comprises means for addressing the multilexer, the analog-digital converter, the programmable ain amplifier, the digital-analog converters and the egisters.

According to another feature of the invention, the stem also comprises automatic resetting means having utputs connected to the control inputs of the latches id the counter, inputs of said resetting means being innected to the outputs of the addressing means.

According to another feature of the invention, each hotosensitive cell comprises an electromagnetic radiation emitter and a photosensitive receiver having an iput, which is connected to an input of one of the utput amplifiers.

According to yet another feature of the invention, the mitter comprises a light source illuminating an optical bre towards the zone containing the data to be acuired, the photosensitive receiver incorporating a photosensitive detector and an optical fibre supplying to the etector electromagnetic radiation reflected on the one containing the data to be acquired.

According to another feature of the invention, the hotosensitive cells comprise a common white light radiation emitter and three receivers photosensitive to different wavelengths of said radiation.

According to yet another feature of the invention, the emitter comprises a white light radiation source illuminating an optical fibre directed towards the zone containing the data to be acquired, the receivers respectively comprising a photosensitive detector and an optical fibre feeding to the said detector, the radiation reflected on said zone, each detector being associated with switchable optical filters, respectively sensitive to the different wavelengths.

According to another feature of the invention, the photosensitive cells comprise at least one common emitter able to selectively emit radiation at different wavelengths, and for each photosensitive cell a receiver sensitive to the different wavelengths and intensities of said radiation.

According to another feature of the invention, the common emitter comprises at least one source able to emit by switching radiation of different wavelengths, said source illuminating an optical fibre directed towards the zone containing the data to be acquired, each receiver comprising a photosensitive detector at the different wavelengths and an optical fibre supplying the detector with the radiation reflected on said zone.

According to yet another feature of the invention, the memory connected to the processor also contains control instructions for the means for displacing the optoelectronic means as a function of the binary value words supplied to the processor by the coding means.

According to another feature of the invention, the memory connected to the processor also contains switching instructions for the filters.

According to yet another feature of the invention, the memory connected to the processor also contains switching instructions for the source.

According to another feature of the invention, the optical fibres are associated with focusing means.

BRIEF DESCRIPTION OF THE DRAWINGS

The invention is described in greater detail hereinafter relative to non-limitative embodiments and the attached drawings, wherein are shown:

FIGS. 4A and 4B, the addressing and resetting means used in the system according to the invention.

FIG. 6, a diagram providing a better understanding of the operation of the system according to the invention, when the optoelectronic means face a curve C.

FIG. 7, a table providing a better understanding of the function of the transition signals in the system according to the invention.

FIG. 8, the content of a register of the coding means containing a binary word representing the characteristic transitions of certain signals in the system according to the invention.

DETAILED DESCRIPTION OF THE PREFERRED EMBODIMENTS

Figure 1:
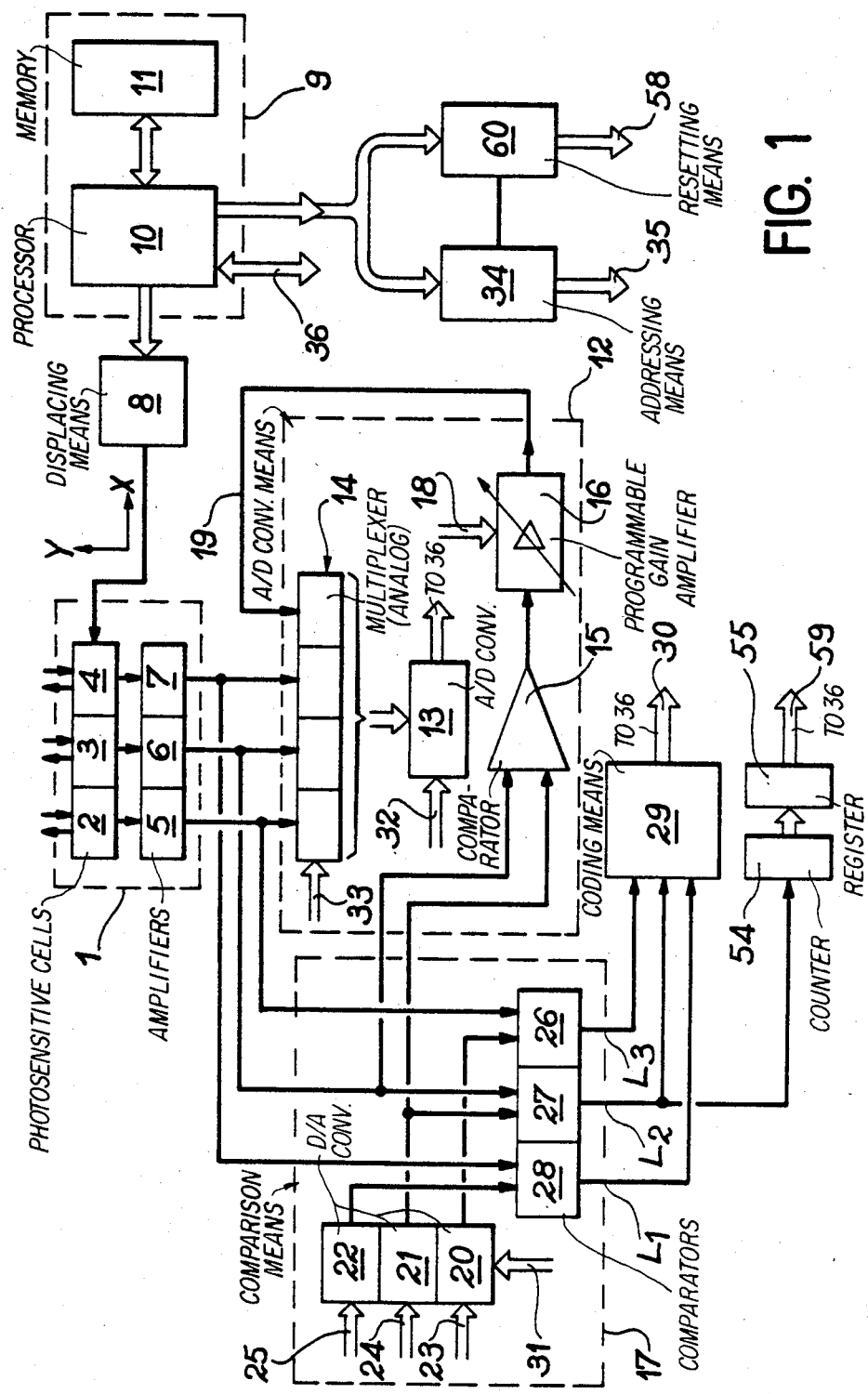
FIG. 1 diagrammatically, a graphic data acquisition system according to the invention.

FIG. 1 diagrammatically shows a graphic data acquisition system according to the invention. This system comprises detection means 1, sensitive to the different intensities of electromagnetic radiation having predetermined wavelengths, coming from the graphic data on a not shown support, such as e.g. a sheet of paper. According to a preferred embodiment of the invention, the detection means are optoelectronic means comprising photosensitive cells 2, 3, 4, which will be described in greater detail hereinafter. The outputs of these cells are respectively connected to the inputs of output amplifiers 5, 6, 7. The outputs of amplifiers 5, 6 supply analog signals, whose amplitudes respectively depend on the intensity of the radiation emitted by the graphic data to be acquired. The system also comprises means 8, which are not shown in detail in FIG. 1 and which are known in the art, for displacing the optoelectronic means 1, at least facing a zone containing the data to be acquired, parallel to one of the two axes X, Y of a fixed coordinate. The system also comprises control and processing means 9 incorporating a processor 10 connected to the displacement means 8, as well as to a memory 11. Analog-digital conversion means 12 receive analog signals supplied by the optoelectronic means, during the displacements of said means 1. The analog-digital conversion means supply the processor with digital values corresponding to the amplitudes of the analog signals received. Memory 11 connected to processor 10 more particularly contains control instructions for the displacement means 8, in such a way that the displacement of the optoelectronic means is marked in the fixed coordinate and is carried out parallel to one or other of the two axes X, Y of said fixed coordinate. Memory 11 also contains processing and addressing instructions, which will be described hereinafter. These instructions enable the processor to process and address digital values collected at the outputs of the analog-digital conversion means 12, with respect to the coordinates of the data to be acquired in the chosen fixed coordinate.

The analog-digital conversion means 12 comprise an analog-digital converter 13, whose outputs are connected to processor 10 and programmable means constituted, in the manner to be shown hereinafter, by an analog multiplexer 14, an analog comparator 15, and a programmable gain amplifier 16. These programmable amplification means make it possible to adapt to the input scale of the analog-digital converter 13, the amplitudes of the signals supplied to said converter. This adaptation is carried out on either side of a predetermined mean reference amplification amplitude, which will be described in greater detail hereinafter. The gain of the amplification means, programmable by processor 10, is dependent on the desired scale of numerical values collected at the output of the analog-digital converter 13. The system also comprises comparison means 17 having logic outputs, for comparing the instantaneous values of the amplitudes of the signal supplied by th optoelectronic means with the mean reference compari son amplitude values during the displacements of th optoelectronic means. The changes to the logic states c the signals supplied by comparison means 17 are repre sentative, as will be shown hereinafter, of instantaneou characteristic transitions in the intensities of the radia tion from the graphic data.

The detection means 1, which are of an optoelec tronic type in the present embodiment, comprise a me dian photosensitive cell 3 and two photosensitive cell 2, 4, e.g. aligned with the median cell and positioned o either side thereof, e.g. symmetrically relative theretc As will be shown hereinafter, said cells can be alignei parallel to one of the axes X or Y of the fixed coordi nate. The reference comparison and amplification am plitudes are determined during a displacement of th optoelectronic means permitting a prior scanning fo detecting the zone containing the data to be acquired.

The analog multiplexer 14 has inputs respectivel connected to the outputs of output amplifiers 5, 6, 7, a well as an input 19 connected to an output of program mable amplifier 16. Programmable amplifier 16 is con nected by an input to an output of the analog compara tor 15. One input of this comparator receives a signal, t be described hereinafter, and which has the aforemen tioned reference amplification amplitude. Its other inpu receives analog signals supplied by the amplifier 6 cor responding to the median cell, during displacements o the optoelectronic means facing the zone containing th graphic data to be acquired. The gain of amplifier 16 i regulated by binary data applied to inputs 18 by th processor. These data are dependent on instruction contained in memory 11 and which intervene followin a calculation of the mean reference amplification ampli tude.

The reference amplification and reference compari son amplitudes are obtained in the following way. Fo each of the photosensitive cells 2, 3, 4, all the digita values corresponding to the amplitudes of the signal supplied on the outputs of output amplifiers 5, 6, 7 ar recorded in memory 11 of processor 10. The processo respectively establishes reference amplitudes for th outputs of amplifiers 5, 6, 7. For the outputs of thes amplifiers, these amplitudes are respectively mean ref erence comparison amplitudes. The reference amplifi cation amplitude is established with the aid of maximun and minimum digital values corresponding to the maxi mum and minimum amplitudes of the analog signal collected at the output of amplifier 6 during prior scan ning. As a function of the desired scale of digital value which are to be made to correspond with the analo signals at the output of the analog-digital converter 13 the gain of amplifier 16 is fixed on the basis of this anc by means of processor 10. Multiplexer 14 is an analo multiplexer, which has an input 19 to which is appliec the output signal of amplifier 16. Thus, this multiplexe makes it possible to switch each of the analog signal coming from the output amplifiers 5, 6, 7, or comin from amplifier 16.

The comparison means 17 having logic outputs com prise, for each of the output amplifiers 5, 6, 7, a digital analog converter, which are designated as 20, 21, 22 ii the drawing. Each digital-analog converter receives o one input a digital reference value supplied by proces sor 10. This digital value corresponds to the mean refer ence comparison amplitude for the analog signal sup plied by the corresponding output amplifier. The digita value applied to input 23 of converter 20 corresponds to the mean reference comparison amplitude for the analog signal supplied by amplifier 5. In the same way, the digital values supplied to inputs 24 and 25 of converters 21 and 22 correspond to the mean reference comparison amplitudes for the analog signals supplied by output amplifiers 6 and 7. Comparison means 17 also comprise TTL-compatible analog comparators 26, 27, 28 with binary logic outputs and corresponding respectively to the output amplifiers 5, 6 and 7. Each comparator has an input connected to the output of the corresponding digital-analog converter, for receiving an analog signal, whose amplitude corresponds to the chosen numerical reference value. Thus, for example, comparator 26 has an input connected to the output of the digital-analog converter 20. Another input of each comparator is connected to the output of the corresponding output amplifier. Thus, for example, in the drawing, the other input of comparator 26 is connected to the output of output amplifier 5. Each comparator supplies to an output, a logic signal, which will be described in greater detail hereinafter. The state of this signal characterizes the intensity state of the radiation emitted by the graphic data and detected by the corresponding cell. These states are detected during the acquisition of the graphic data and respectively indicate whether the amplitude of the signal supplied by the output amplifier of a cell is higher or lower than the mean reference comparison amplitude for this cell. Thus, the passage from state 0 to state 1 of the output signal of a comparator indicates that the amplitude of the output signal of the corresponding output amplifier is higher than the reference comparison amplitude for said amplifier. Conversely, the passage from state 1 to state 0 of the output signal of a comparator indicates that the amplitude of the output signal of the corresponding output amplifier is below the mean amplitude for this amplifier. More specifically, when for example the system has to acquire graphic data constituted by a black curve on white paper and when e.g. cell 2 is on the curve, the output signal of the comparator 26 corresponding to this cell is in state 1, whilst the output signals of comparators 27 and 28 are in state 0. When the optoelectronic means are then displaced parallel to X or Y, in such a way that cell 3 is then positioned above the curve, the output signal of comparator 26 passes to state 0, the output signal of comparator 28 remains unchanged, whilst the output signal of comparator 27 corresponding to cell 3 passes to state 1. Thus, the output signals of comparators 26, 27 and 28 represent characteristic transitions of the intensities of radiation emitted by the graphic data and detected by the optoelectronic cells. In the present example, the mean reference comparison amplitudes preestablished during an exploratory scanning or sweep operation for the output signals of each output amplifier constitute thresholds. These thresholds represent the definition between black-body radiation emitted by the curve and white radiation emitted by the sheet of paper on which the curve is drawn.

The system also comprises coding means 29 having inputs connected to the outputs of comparators 26, 27, 28. As will be shown hereinafter, said coding means make it possible to form, during the acquisition of data, "words" of instantaneous binary values. They represent instantaneous binary states of the outputs of comparators 26, 27, 28 and also make it possible to mark the outputs of the comparators for which the signals undergo a binary state change during a displacement of the optoelectronic means. These "words" are supplied to processor 10 by outputs 30 of coding means 29. Finally, it is also possible to see counting means, constituted by a counter 54 and a register 55, whose outputs 59 are connected to bus 36, said means being described hereinafter. Input 18 of the programmable gain amplifier 16, inputs 31 of the digital-analog converters 20, 21, 22, inputs 32, 33 of the analog-digital converter 13 and multiplexer 14 are addressing inputs. These inputs are connected to the addressing outputs 35 of addressing means 34, which will be described in greater detail hereinafter and which are controlled by processor 10. It will be shown hereinafter that the system comprises means 60 for resetting resisters and latches or flip-flops. The resetting control signals are available on the outputs 58 of means 60. These resetting means are controlled by addressing means 60 and by processor 10.

Figure 2:
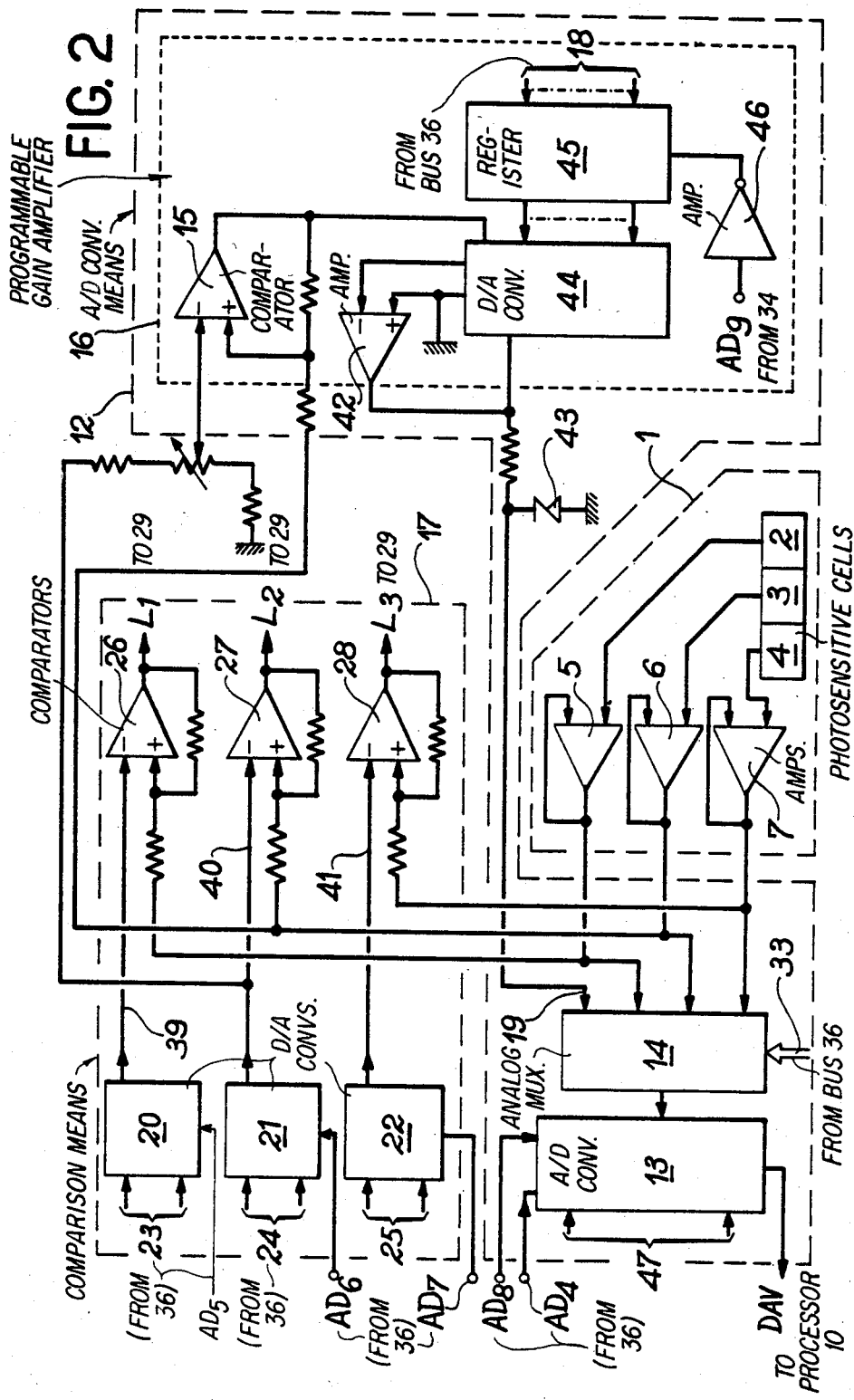
FIG. 2, in greater detail, the amplification means and comparison means used in the system according to the invention.

FIG. 2 shows in greater detail, the amplification means 12 and the comparison means 17. The digital-analog converters 20, 21, 22 of comparison means 17 are not shown in detail. Their inputs are indicated at 23, 24, 25 and are connected to an interface bus 36, connected to processor 10. It is also possible to see the addressing inputs $AD_5$, $AD_6$, $AD_7$ of these converters and which are connected to the outputs 35 of addressing means 34 (FIG. 1). FIG. 2 does not show the polarization circuits of these converters. These converters are, for example, of type $DACUP_8BC$, marketed by DATEL. The outputs of the converters are respectively connected to inputs 39, 40, 41 of comparators 26, 27, 28, which have a slight hysteresis, to prevent uncertain or oscillating values on their outputs $L_1$, $L_2$, $L_3$, which are connected to the inputs of the coding means 29 (FIG. 1). These comparators are special known differential amplifiers and FIG. 2 shows resistors making it possible to fix the hysteresis threshold (a few millivolts) compatible with the noise level of the input signal. Digital-analog converters 20, 21, 22 have inputs 23, 24, 25, which represent, for example, 8 parallel inputs for each converter. The programmable gain amplification means 16 more particularly comprise, in the manner shown hereinbefore, a unity gain analog comparator 15, which is constituted by a differential amplifier and the various resistors are not designed by reference numerals in the drawing. These resistors make it possible to fix the gain and polarization of this differential amplifier. The inputs of amplifier 15 are respectively connected to the output 37 of the digital-analog converter corresponding to the median optoelectronic cell 3 and to the output of amplifier 6, corresponding to said cell. Each output amplifier 5, 6, 7 also has a differential amplifier and a negative feedback loop, the inputs of said amplifiers being respectively connected to the outputs of cells 2, 3, 4, said amplifiers being impedance matching means. The output of comparator 15 is connected to one input of the programmable gain amplifier 16. Thus, this amplifier comprises an operational amplifier 42, whose output is connected via a not shown resistor and a Zener diode 43 for protecting multiplexer 14 at its input 19. The programmable gain amplifier 16 also comprises a digital-analog converter 44, whose inputs are connected to the outputs of a register 45. Register 45 has 8 inputs and 8 parallel outputs, the inputs 18 being connected to bus 36 for receiving the data necessary for programming the gain, the internal network of converter 44 being used in negative feedback by the operational amplifier 42, hence the connections passing from converter 44 to the inputs and outputs of amplifier 42 and the output of amplifier stage 15. Register 45 is addressed by a signal AD 9 applied to an input of said register by means of an inverting amplifier 46. Converter 44 is, for example, of type AD 7523, marketed by the Analog Devices Company. Register 45 is, for example, of type 74 LS 273. Thus, the digital-analog converter 44, not shown in detail in FIG. 2, is a network of multiplier-type resistors controlled by the data of register 45 and makes it possible to regulate the gain of amplifier 42 on the basis of values varying between 1 and 256. Analog multiplexer 14 is addressed on inputs 33 by data from bus 36. The outputs 47 of analog-digital converter 12 are connected to the bus in such a way that the processor processes and records in its memory, the digital values corresponding to the analog signals collected on the outputs of output amplifier 5, 6, 7. Analog-digital converter 13 also has addressing inputs $AD_4$ and $AD_6$ corresponding to the addressing inputs 32 of FIG. 1. It also has an output DAV connected to processor 10 and making it possible to indicate to the latter by a specific signal that digital values are available on outputs 47. The output of multiplexer 14 is obviously connected to an input of the converter 13.

Figure 3:
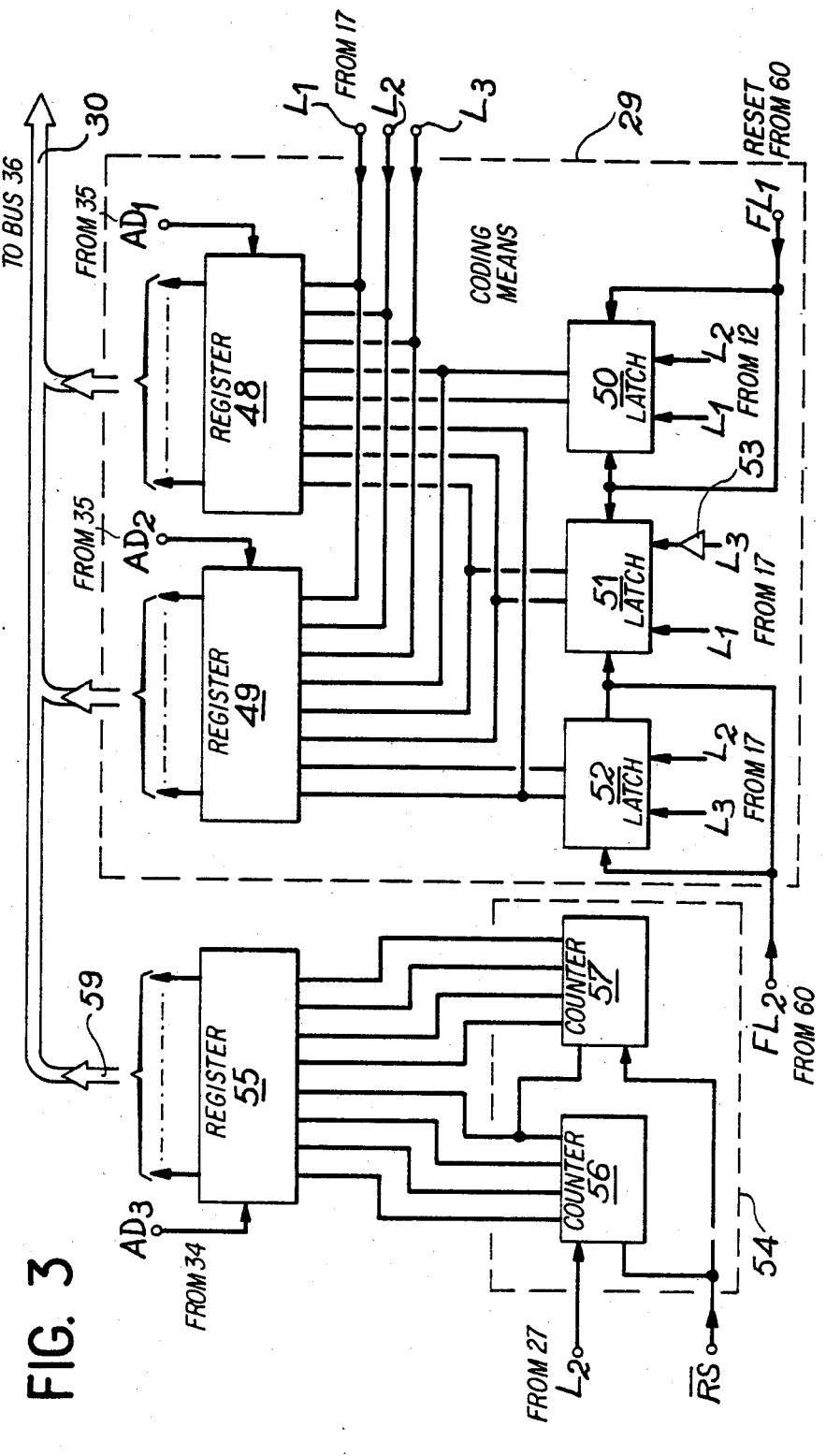
FIG. 3, in greater detail the coding means and counting means used in the system according to the invention.

FIG. 3 shows in greater detail the coding means 29 of FIG. 1, whose outputs 30 are connected to the processor via bus 36, in order to supply to said processor words of instantaneous binary values representing the instantaneous binary states of outputs $L_1, L_2, L_3$ of comparators 26, 27, 28. The outputs 30 of the coding means also supply binary values making it possible to mark the signals of the outputs of comparators 26, 27, 28, which have just undergone a binary state change following a displacement of the optoelectronic means 1. The coding means comprise at least one register having parallel inputs and outputs, whose inputs are connected to the outputs $L_1, L_2, L_3$ of comparators 26, 27, 28. Thus, in the embodiment shown in the drawing, the coding means comprise two registers 48, 49 having 8 inputs and 8 parallel outputs. Registers 48, 49 are addressed on inputs $AD_1$ and $AD_2$ by signals from the outputs 35 of the addressing means 34, which will be described hereinafter. Registers 48, 49 are of type 74 LS 244. Coding means 29 also comprise three bistable latches 50, 51, 52, respectively having two control inputs. The two control inputs of latch 50 are respectively connected to the outputs $L_1$ and $L_2$ of the first and second comparators 26, 27 of comparison means 17. One of the control inputs of the second latch 51 is connected to the outputs $L_1$ of the first comparator 26, whilst the other control input of this latch is connected to the output $L_3$ of the third comparator 28, via an inverting amplifier 53. Finally, the control inputs of the third latch 52 are respectively connected to outputs $L_2$, $L_3$ of the second and third comparators 27, 28. These latches have resetting inputs which receive the resetting signals $FL_1$ and $FL_2$ supplied by the outputs 58 of the resetting means 60 (FIG. 1), which will be described hereinafter. Each latch has complementary outputs, which are respectively connected to the inputs of registers 48, 49. For reasons to be described hereinafter, the first latch 50 is sensitive to the rising fronts of the signals applied to the control inputs. The second and third latches 51, 52 are sensitive to the falling fronts of the signals applied to their control inputs. Latch 50 is of type 74 LS 74, whilst latches 51, 52 are of type 74 LS 73.

The system also comprises a counter 54, whereof an input is connected to the output L2 of comparator 27, which corresponds to the median cell 3 of the optoelectronic means 1. This counter trips on a change of state and makes it possible to record the number of state changes undergone by the output signal of comparator 27, during the acquisition of data or during a prior scanning. Outputs 59 of this counter are connected to bus 36 via a register 55, having parallel outputs and inputs (e.g. 8 inputs and 8 parallel outputs). For example, counter 54 can comprise two counting stages 56, 57, which are connected in series. These counting stages respectively have resetting inputs. Resetting can be controlled by a signal $\overline{RSC}$ from resetting means 60 (FIG. 1). The two counting stages are of type 7493, whilst register 55 is of the aforementioned type 74 LS 244. On an input $AD_3$ this register is addressed by the outputs 35 of the addressing means 34 (FIG. 1). The count of the state changes of the output signal of comparator 27 can be used when the graphic data to be recognised are e.g. the rods of a rod code, such as a bank check code.

Figure 4A:
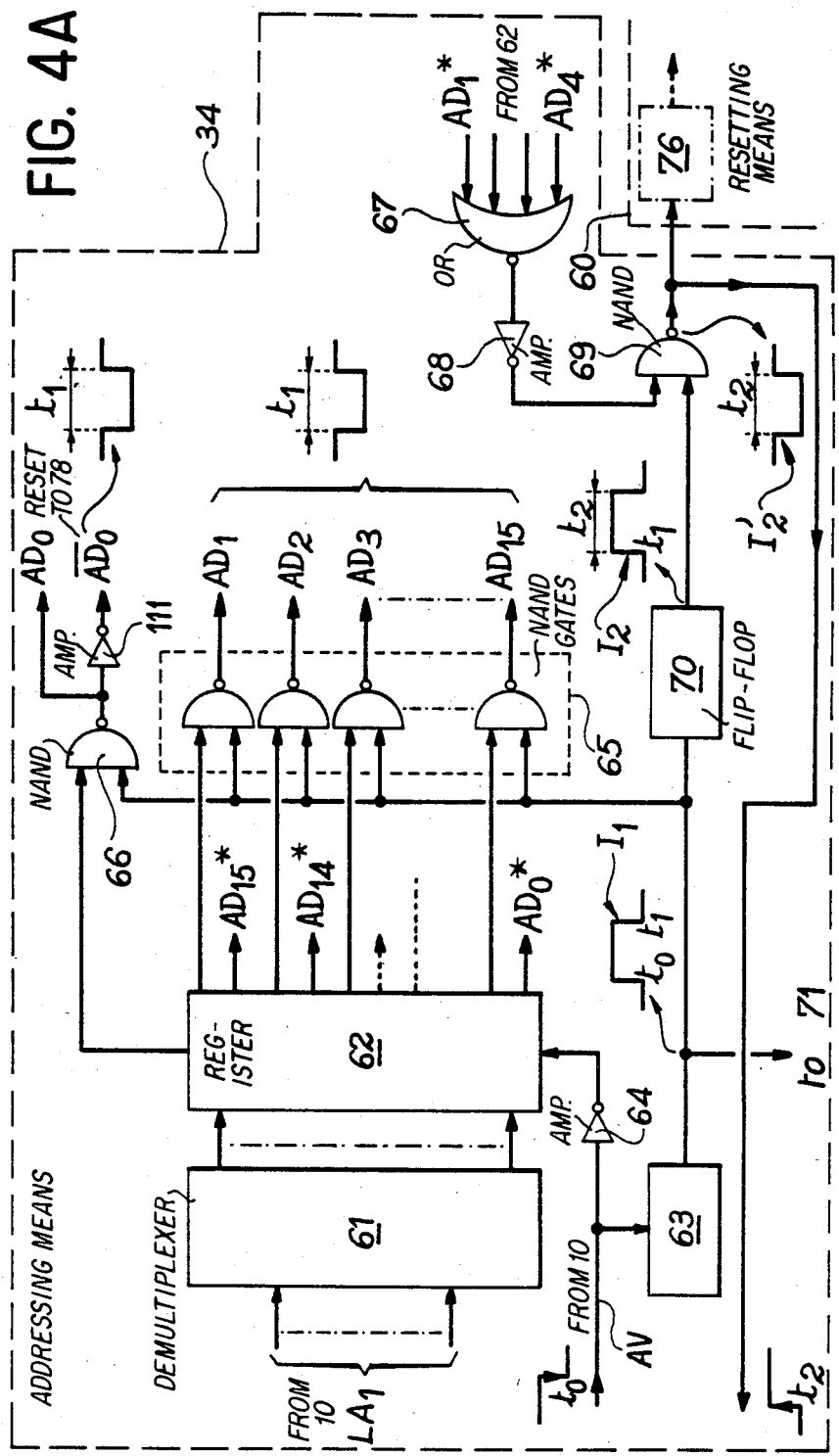

FIGS. 4A and 4B show addressing means 34 and resetting means 60 of FIG. 1. By means of signals $AD_1$, $AD_2$, $AD_3$, these addressing means make it possible to address the registers 48, 49 and 55 (FIG. 3) and by means of signals $AD_4$, $AD_8$, also make it possible to address the analog-digital converter 13 and by signals $AD_5$, $AD_6$, $AD_7$ respectively the digital-analog converters 20, 21, 22 (FIG. 2). Finally, these addressing means make it possible to address programmable gain amplification means 16 by a signal $AD_9$ applied to the input of inverting amplifier 46 (FIG. 2). The outputs of the addressing means which supply these signals are designated by 35 in FIG. 1.

The resetting means 60 permit the resetting of counter 54 and the resetting of latches 51, 52 (FIG. 3) respectively, by means of signals $\overline{RSC}$, $FL_1$, $FL_2$. The outputs of the resetting means supplying these signals are designated 58 in FIG. 1.

Addressing means 34 comprise a demultiplexer 51 whose inputs $LA_1$ are connected to control lines (addresses) coming from processor 10. This demultiplexer can comprise two circuits of types 74 LS 138. In per se known manner, it makes it possible to decode the addresses supplied by the processor. The output of demultiplexer 61 are connected to the inputs of a register 62 making it possible to record, in the form of logic levels, the addresses decoded by the demultiplexer. The said logic levels designated $AD_0^* \ldots AD_{15}^*$ are available at the inverted inputs $\overline{Q}$ of register 62 which in the present embodiment has 16 outputs. These logic levels are converted into pulses $AD_1, AD_2 \ldots AD_6$ by means of a monostable flip-flop 63, an inverting amplifier 64 and a system of AND gates 65 having inverted outputs. The two inputs of each of these gates are respectively connected to the output of a monostable flip-flop 63 and to the corresponding direct output Q of register 63. Monostable flip-flop 63 receives an address validation signal AV from the processor, which is also transmitted by means of the inverting amplifier 64 to the loading control input LD of register 62. Monostable flip-flop 63 in fact supplies the reception time $t_o = 0$ of signal AV, with a pulse $I_1$ of duration $t_1$. Pulses $AD_0 \ldots AD_{15}$ obtained at the inverted outputs of the AND gate 65 also have a duration $t_1$. The addressing circuit also comprises an AND gate 66 with an inverted output. The two inputs of this gate are respectively connected to an output of register 62 and to the output of the monostable flip-flop. On a command from the processor, this gate supplies a pulse $AD_0$ of duration $t_1$. As will be shown hereinafter, this pulse makes it possible to control a general resetting the system. The addressing means 34 also comprise an OR gate 64 with an inverted output, having four inputs respectively connected to the outputs of register 2 and which supply the address levels $AD_1^*$, $AD_2^*$, $AD_3^*$, $AD_4^*$. The inverted output of OR gate 67 is connected via an inverting amplifier 68 to an input of an AND gate 69 having an inverted output. The other input of gate 69 is connected to the output of a monostable flip-flop 70 which supplies, on the falling front of pulse $I_1$, a pulse $I_2$ of duration $t_2$. The inverted output of AND gate 69 supplies an inverted pulse $I'_2$ of duration which, as will be shown hereinafter, indicates that the binary values contained in registers 48, 49, 55 and the values contained in the analog-digital converter 13 can be taken into account by the processor. Register 62 comprises circuits of type 74 LS 175, whilst monostable flip-flops 63 and 70 are of type 74 LS 123.

The resetting means 60 comprise a demultiplexer 71, whose inputs $LA_2$ are connected to the control lines (addresses) from the processor and whereof a control input EN is connected to the output of monostable flip-flop 63. This demultiplexer is of type 74 LS 139 and supplies at its outputs decoded address signals $SAD_1$, $SAD_2$, $SAD_3$. As will be shown hereinafter, signal $SAD_1$ makes it possible to obtain the resetting signal $\overline{SC}$ of counter 54 (FIG. 3). Signal $SAD_2$ makes it possible to obtain one or other of the resetting signals $FL_1$, $FL_2$ for latches 50, 51, 52 of coding means 29 (FIG. 3). The resetting means also comprise a double bistable latch 72. The inputs $S_1$, $S_2$ of the monostable flip-flop are respectively connected to the outputs of demultiplexer 71, which supplies signals $SAD_1$ and $SAD_2$. This flip-flop also comprises another input able to receive signal $AD_0$ making it possible to reset all the registers and flip-flops and latches of the system. The bistable latch 72 also has complementary outputs Q and $\overline{Q}$. Output Q of latch 72 is connected to one of the inputs of an AND gate 73 having an inverted output. Another input of this gate is connected to the output of register 62, which supplies the address level $AD_3^*$. The inverted output of AND gate 73 is connected to an input of a three-state gate 74 of type 74 LS 126. Another input of this gate is connected to the complementary output $\overline{Q}$ of a monostable flip-flop 75, whose input is connected to the direct output Q of another monostable flip-flop 76. These flip-flops 75, 76 are of the same type as the aforementioned flip-flops 63, 70. Monostable flip-flop 76 having a pulse time is tripped by the rising front of pulse $I_2$ supplied at the inverted output of AND gate 69. Monostable flip-flop 75 is tripped on the falling front of the pulse supplied by the output of monostable flip-flop 5 and has a pulse time $t_4$. The output of the three-state gate 74 is connected to the input of an AND gate 77 with an inverted output. Another input of gate 77 is connected to the output of one of the AND gates 65 having an inverted output and which supplies signal $AD_{10}$. Finally, the inverted output of AND gate 77 is connected to an input of an OR gate 78 having an inverted output. Another input of OR gate 78 is connected to the inverted output of AND gate 66 which supplies signals $AD_0$. The inverted output of OR gate 78 is able, under the conditions to be described hereinafter, to supply the resetting signal $\overline{RSC}$ of counter 54. Thus, the application of signal $AD_{10}$ to the input of AND gate 77, with the inverted output, makes it possible to only reset counter 54, whilst the application of signal $AD_0$ to one of the inputs of the OR gate 78, with the inverted output, enters into a procedure permitting the general resetting of all the counters of the system.

The complementary output $\overline{Q}$ of the double bistable latch 72 is connected to an input of a three-state gate 80, e.g. of type 74 LS 126. Another input of gate 80 is connected to the output of the monostable flip-flop 75. The output of gate 80 is connected to an input of inverting amplifier 81. The output of this amplifier is connected on the one hand to an input of an AND gate 82, having an inverted output, and on the other hand to the input of and AND gate 83, having an inverted output. The other inputs of gates 82 and 83 are respectively connected to the outputs of register 62, which supply the signals $AD_1^*$ and $AD_2^*$. The inverted outputs of gates 82,83 are respectively connected to the inputs of circuit 84, 85 having transistors operating as open collectors. The outputs of these circuits respectively supply the resetting signals $FL_1$, $FL_2$ for the lathes 50, 51, 52 of coding means 29 (FIG. 3).

The output of demultiplexer 71 supplying signal $SAD_3$ is connected to an input S of a single monostable flip-flop $AD_6$, e.g. of type 74 LS 73. An input R of this flip-flop is connected to the inverted output of the AND gate 66 supplying signal $AD_0$. The complementary output $\overline{Q}$ of flip-flop 86 is connected to an input of a three-state gate 87, e.g. of type 74 LS 126. Another input of this gate is connected to the output of monostable flip-flop 75. The output of gate 87 is connected to an input of an inverter 88, whose output is connected to an input of an AND gate 89. The other input of gate 89 is connected to the inverted output of OR gate 90, via an inverting amplifier 91. The inputs of the OR gates 90 are respectively connected to the outputs of register 62, which supply the address levels $AD_1^*$ and $AD_2^*$. The output of gate 89 is connected to an input of an AND gate 92 having an inverted output. The two inputs of gate 89 are respectively connected to the inverted output of gate 66, which supplies signal $AD_0$, and to the output of one of the AND gates 65, which supplies signal $AD_{11}$. The inverted output of AND gate 92 is connected to an input of inverter 93. The output of the latter makes it possible to obtain the aforementioned resetting signals $FL_1$ an $FL_2$ via circuits 94, 95 having transistors operating as open collectors and e.g. of type 7407.

Figure 5:
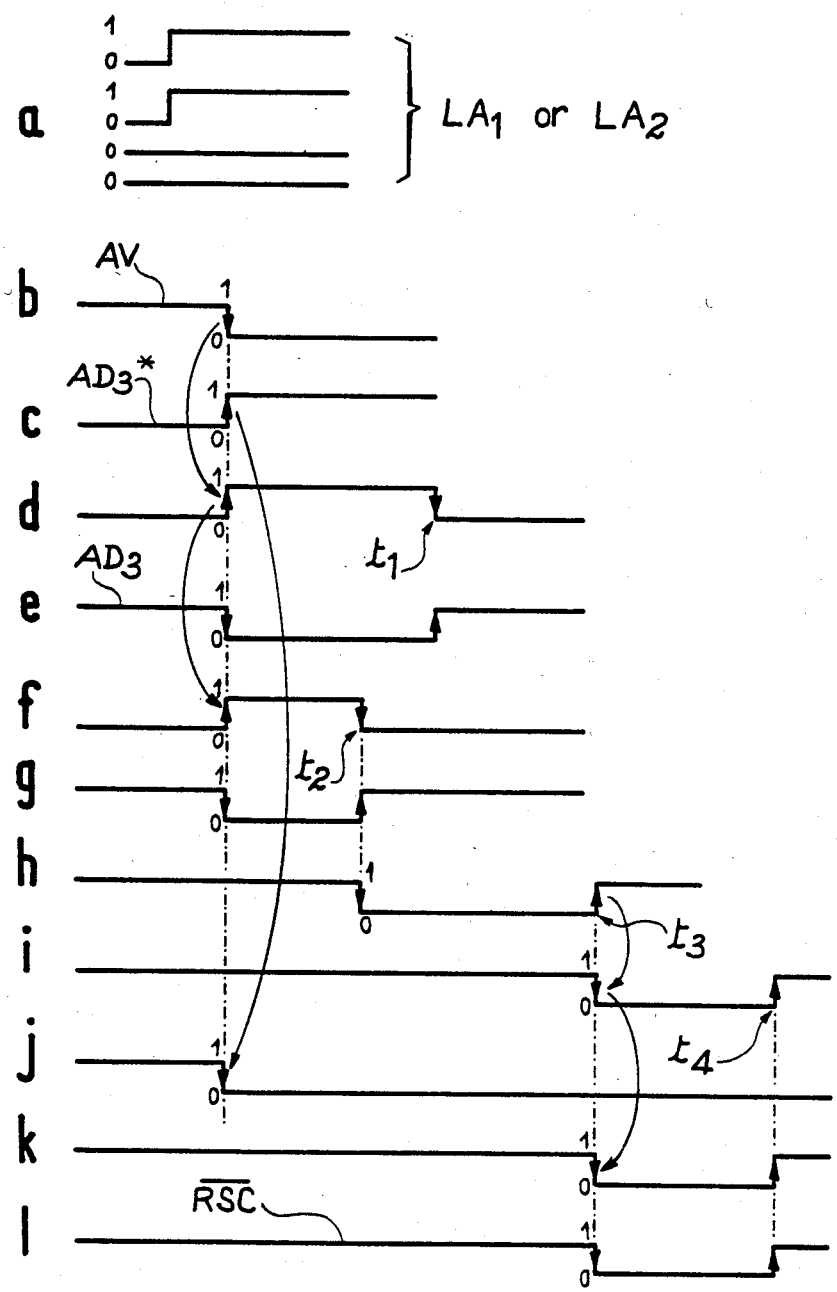
FIG. 5, a chronogram of the signals appearing at the outputs of certain of the elements of the addressing and resetting means.

FIG. 5 is a chronogram of the signals appearing at the outputs of certain of the elements of the addressing means 34 and resetting means 60. This chronogram provides a better understanding of the operation of these means, e.g. in the case where the processor controls a resetting of counter 54 by a signal $\overline{RSC}$.

Diagram a represents the signals from the control lines and respectively reaching the four inputs $LA_1$ of demuliplexer 61. It has been assumed that two of these address lines, which were at zero level, pass to level 1, whilst the two other lines remaining at level 0.

In diagram b, it is assumed that at time $t=0$, an address validation signal AV passing from logic level 1 to logic level 0, is applied to the input of inverting amplifier 64 and to the input of monostable flip-flop 63. This signal leads to the rising of signal $AD_3^*$ on the corresponding output of register 62, as shown as c. The application of signal AV to the input of monostable flip-flop 63 trips the latter on the falling front. The output of flip-flop 63 remains at level 1 between times $t_0$ and $t_1$. The output signal of flip-flop 63, as well as signal $AD_3$ make it possible to obtain, on the inverted output of the corresponding gate 65, the signal $AD_3$ shown in diagram e. This signal has a logic level 0 between times $t_0$ and $t_1$. Passage from logic level 1 to logic level 0 of the output signal of flip-flop 63 leads to the rising of the output signal of monostable flip-flop 70. The output signal of this flip-flop remains at level 1 between times $t_0$ and $t_2$, as shown in diagram f. The inverted output of gate 69 has a logic level 0 between times $t_0$ and $t_2$, bearing in mind the output level of flip-flop 70 and the level of signal $AD_3^*$ applied to one of the inputs of the OR gate 67, having an inverted output. The signal on the inverted output of gate 79 is shown in diagram g. The rising of the output signal of gate 69 leads to the tripping of the monostable flip-flop 76, whose output signal passes from logic level 1 to logic level 0 between times $t_2$ and $t_3$, as shown in diagram h. The rising of the output signal of monostable flip-flop 76 leads to the falling of the output signal of monostable flip-flop 75, which remains at logic level 0 between times $t_3$ and $t_4$, as shown in diagram i.

It is assumed that the signal from the control lines and which are applied to the inputs $LA_2$ of demultiplexer 71 are such that signal $SAD_1$, on an output of demultiplexer 71, is at logic level 1. The signal on output $Q_1$ of flip-flop 72 then passes to logic level 1. As signal $AD_3^*$ is at logic level 1, the signal on the inverted output of gate 73 passes to logic level 0 at time $t_0$, as shown in diagram j. This signal is applied to one of the inputs of the three-state gate 74, whilst the other input of this gate receives the output signal from monostable flip-flop 75. This output signal is at logic level 0 between times $t_3$ and $t_4$. Thus, at the output of the three-state gate 74, the signal which was at logic level 1 passes to logic level 0 between times $t_3$ and $t_4$, as shown in diagram k. The application of the output signal of gate 74 to the input of the AND gate 77, having an inverted output, via OR gate 78 with the inverted output, leads to the falling of signal $\overline{RSC}$, between times $t_3$ and $t_4$, at the output of gate 78. This signal is shown in diagram 1 and it is applied to the corresponding input of counter 54 to bring about its resetting.

The resetting of counter 54 by signal $\overline{RSC}$ can also be performed by applying a signal $AD_{10}$ of logic level 0, coming from the corresponding output of one of the gates 65 and applied to another input of gate 77. This resetting can also be carried out by applying a signal $AD_0^*$ of logic level 1, applied to another input of the OR gate 78. This signal is obtained from signal $AD_0$ and inverter 111. In the presently described resetting means, the signals $AD_0$ and $AD_0^*$ are pulses for the general resetting of all the registers, flip-flops and latches of the system.

The resetting of latches 50, 51, 52 of coding means 29 will not be described in detail. This resetting can either be selective by means of signal $SAD_2$ applied to input $S_2$ of flip-flop 72, or general by means of signal $SAD_3$ applied to input S of flip-flop 86. When resetting is selected, it is then necessary to apply signals $AD_1^*$ and $AD_2^*$ to the inputs of the AND gates 82, 83, which have inverted outputs. These signals bring about a drop from logic level 1 to logic level 0 of one of the signals $FL_1$ or $FL_2$. When the resetting is non-selective, the output signal $AD_0$ of gate 66, having logic level 0, is applied to input R of flip-flop 86. The signals $AD_1^*$ and $AD_2^*$ of the requisite level are also applied to the inputs of AND gate 90 having an inverted output. The application of signal $AD_0$ to an input of AND gate 92 having an inverted output, then leads to the simultaneous fall of signals $FL_1$ and $FL_2$. Signal $AD_{11}$, which can be applied to one of the inputs of AND gate 92 having an inverted output, is a safety signal making it possible to bring about a fall of signals $FL_1$ and $FL_2$ from logic level 1 to logic level 0, no matter what the logic state of the other signals. It is obvious that the output signal $AD_1, AD_2 \ldots AD_9$ of gates 65 are respectively supplied to the requisite inputs of the registers, converters, amplifiers, etc of FIGS. 2 and 3 in order to address these various elements.

In the chronogram described hereinbefore, the signal transmission times have not been shown, because they are negligible compared with the pulse times.

The system described hereinbefore can operate according to two different modes.

This system can firstly operate in accordance with a quantitative mode. In this quantitative mode, only the median cell 3 is used, the multiplexer 14 being addressed on its inputs 33 by processor 10 in order to select the logic signal coming then from the output of amplifier corresponding to median cell 3. The optoelectronic means 1 are then positioned facing the zone containing the data to be acquired, under the control of software recorded in memory 11 of processor 10, the said zone being scanned in stepwise manner. For each step, the logic output signal of amplifier 6 is converted into a digital or numerical value by the analog-digital converter 13. The processor then investigates the maximum MA and minimum MI digital values corresponding to the maximum and minimum amplitudes of the logic signals supplied by the output of amplifier 6 during scanning. The digital-analog converter 22 corresponding to the median cell 3 is then loaded with the minimum digital value MI, applied to the inputs 24 of said converter. The output signal of differential amplifier 15 (FIG. 2) then has a zero amplitude for a minimum radiation intensity detected by median cell 3. It is then possible to calculate the gain of the programmable amplifier 16 in order to fix the scale of digital values obtained at the output of the analog-digital converter 13 during amplitude variations of the signals supplied by amplifier 6 between the maximum and minimum amplitudes. These operations represent an optimization of the measuring dynamics of the system. The calculated gain value is then loaded into register 45, addressed by signal $AD_9$. When this gain control has taken place, the system is then ready to acquire data under the control of software recorded in memory 11. Thus, it is optionally possible to define MA and MI as from external calibration values (standard colour scale) or internal calibration values (voltage references).

The system can also operate according to a qualitative mode, which is intended for the automatic digitization of graphic data constituted by a curve, lines, contours, etc and is carried out in an automatic manner.

FIG. 6, as well as the table of FIG. 7, provide a better understanding of the qualitative operation of the system using a simple example. It is assumed that the graphic data are constituted by a black curve C on a white background. The function of comparators 26, 27, 28 making it possible to detect the states and characteristic transitions of light intensities, as well as the function of registers 48, 49 of coding means 29 will now be described in greater detail.

FIG. 6 shows in exemplified manner a portion of a curve C in black on a white background, as well as two positions successively occupied by cells 2, 3, 4, during the displacement thereof, parallel to axis X of the coordinate mark. In this drawing, it is assumed that the cells are aligned parallel to axis Y. The two successive positions of the cells during the displacement parallel to axis Y are designated by $X_i$ and $X_{i+1}$, a distance $\Delta X$ separating these two successive positions. It has also been assumed that the ordinate of median cell 3 is designated $Y_i$ and that the cells are separated by a distance $\Delta Y$. In this case, for position $X_i$, it is the median cell 3 which faces curve C, whilst for position $X_{i+1}$, it is the lateral cell 2 which faces this curve.

For positions $X_i$ and $X_{i+1}$, the table of FIG. 7 shows the binary state of signals $L_1, L_2, L_3$, on the outputs of comparators 26, 27, 28 corresponding to cells 2, 3, 4. Thus, in the considered example, for position $X_i$, the logic levels of signals $L_1, L_2, L_3$ are respectively 0,1,0. For position $X_{i+1}$, these logic levels are respectively 1,0,0 (on assuming in the conventional manner that the level represents the minimum intensity received by the cells, i.e. black in the considered example). In the second line of the table, rising and falling arrows show the direction of the transitions of the levels undergone by signals $L_1, L_2, L_3$ when passing from position $X_i$ to position $X_{i+1}$. Thus, the rising arrow designates a rising transition, because the level of signal $L_1$ has passed from 0 to 1 between $X_i$ and $X_{i+1}$. Thus, the signal $L_1$ corresponding to cell 2 has passed from logic level 0 to logic level 1 because, for position $X_i$, said cell was facing the white background on which curve C is plotted. For position $X_{i+1}$, said cell then faces the black curve C. For median cell 3, the transition is downward and is indicated by a downward arrow. Thus, median cell 3, which was facing the black curve C in position $X_i$, now faces the white background for position $X_{i+1}$. Signal $L_3$ is not defined by any arrow, because the corresponding cell 4 has not undergone any transition. Thus, this cell which was facing the white background in position $X_i$ has remained facing the white background in position $X_{i+1}$.

FIG. 8 shows the bits obtained e.g. in registers 48 and 49 (FIG. 3) for position $X_{i+1}$ of cells 2, 3, 4. The first three right-hand boxes of this register contain bits corresponding to states of signals $L_1, L_2, L_3$ (1,0,0). The three following bits (1,0,0) represent the rising transition of signal $L_1$. Finally, the three other bits (0,1,1) represent the falling transition of signal $L_2$. FIG. 8 provides a possible representation of the arrangement of the bits representing all the useful information. The 9 bit word which is then contained in registers 48 and 49 is read by the processor. As a result of its software, the processor takes account of the bits obtained in this word for controlling a displacement $\Delta Y$ parallel to axis Y, in order to bring the median cell 3 onto curve C. It is only when this median cell is on curve C, that the processor will record the new coordinates $X_{i+1}$, $Y_{i+1}$. Thus, this simple example shows that the use of three cells enables the processor to control displacements, which constantly bring the median cell onto the data to be acquired.

In the qualitative mode, the system firstly functions according to the quantitative mode, during an incremental scanning of the zone containing the data to be acquired, in order to investigate the aforementioned values MA and MI. For example, this incremental scan makes it possible to locate the line of a curve on a sheet. It also makes it possible to calculate the values of the black threshold (N) or white threshold (B), if said line is a black curve on a white background.

Figure 9:
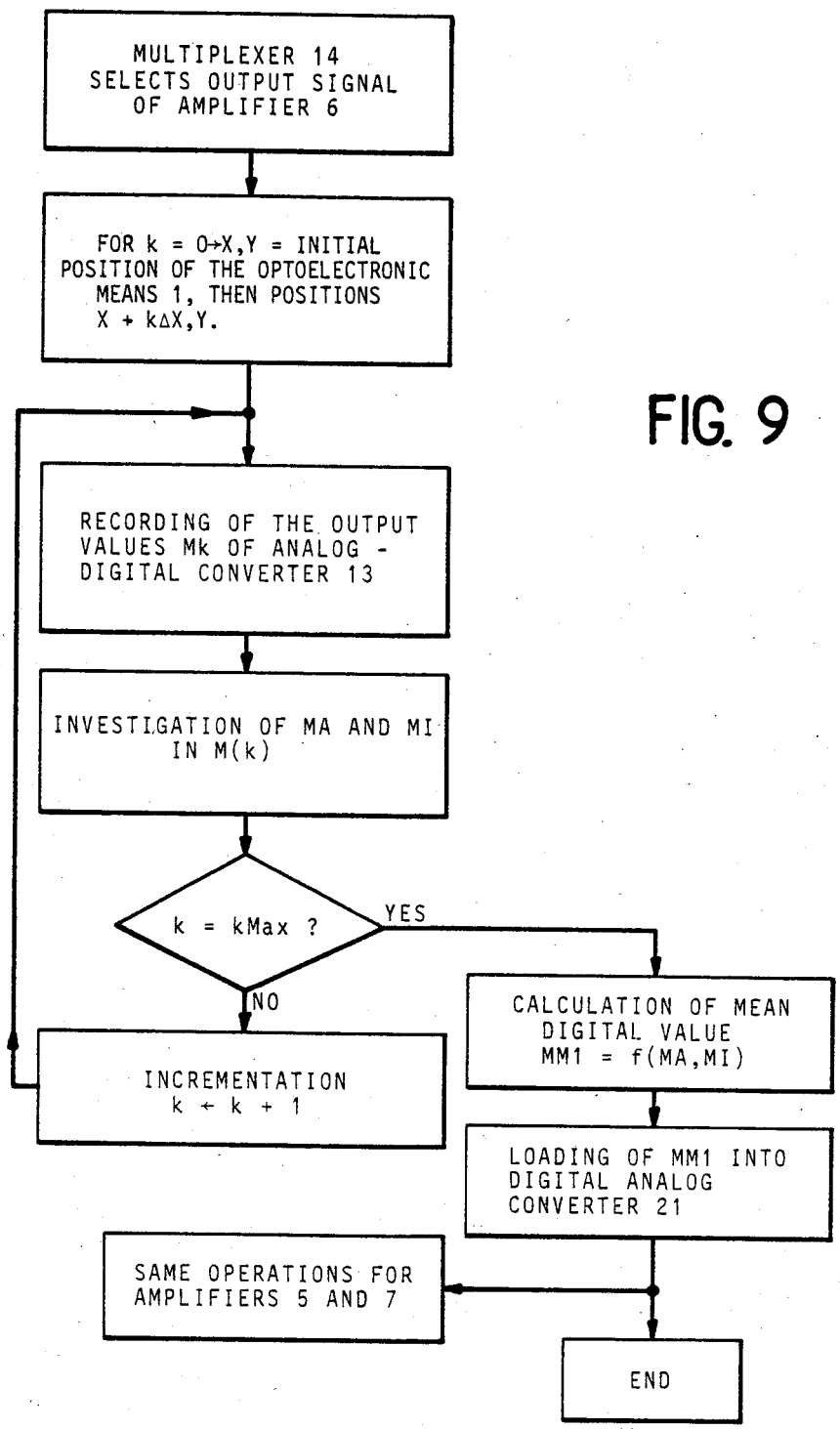
FIG. 9, a flow chart showing the control phases of the system according to the invention.

These operations constitute a first phase of the regulation of the system and are described more specifically in the flow chart of FIG. 9. According to the flow chart, multiplexer 14 firstly selects the output signal of amplifier 6 corresponding to the median cell 3. Then, with the successive positions of the optoelectronic means fixed by the incementation coefficients $k\Delta X$, an initial position of the optoelectronic means 1 is chosen (k=0). The initial position of the optoelectronic means is defined by the coordinates X and Y for k=0. The successive positions are defined by $(X+kx\Delta X)$, Y assuming that the optoelectronic means move parallel to the X axis. For each position of the optoelectronic means and consequently for each value of the incrementation coefficient k, the following operation consists of recording the digital value M(k) supplied at the output of the analog-digital converter 13. This digital value corresponds to each analog signal amplitude supplied by output amplifier 6 of median cell 3. Simultaneously, the maximum and minimum values MA, MI respectively, are sought among the values M(k). The value of incrementation coefficient k is then tested to establish whether it has reached its maximum value (k max) fixed initially as a function of the extent of the zone to be scanned.

If the answer to the question k=kmax? is negative, this means that the incrementation can be continued (k→k+1). The optoelectronic means are then moved by one step parallel to axis X in the considered example, the same operations as those described hereinbefore then being carried out as from the operation of recording the digital output value of analog-digital converter 13.

However, if the answer to the question k=kmax? is positive, the processor calculates the mean digital value $MM_1$ of the digital values recorded in memory 11 of the processor at the time of scanning. This mean digital value then $MM_1$ is between the maximum and minimum digital values and corresponds to the mean amplitude of the output signals of amplifier 6 corresponding to median cell 3. This mean digital value can also be corrected to take account of the non-linearity of the response of the optoelectronic means, as well as irregularities of the support containing the data to be acquired. It is then possible to load this mean digital value into the digital-analog converter 21 by its inputs 24. This initial phase, which can be considered as the automatic investigation of the contrast and adjustment of the thresholds is then at an end for the analog output signals of amplifier 6 corresponding to median cell 3. The same operations have to be carried out respectively for the analog output signals of amplifier 5 and amplifier 7 corresponding to the lateral cells 2 and 4. These operations respectively start by the selection of output signals of amplifier 5 and by multiplexer 14 and the selection of the output signal of amplifier 7 by said multiplexer. The optoelectronic means are then calibrated to operate in boundary marking between two separate reflectivity states.

The following phase consists of digitizing the graphic data acquired by the optoelectronic cells 2, 3, 4 during the displacement of said means facing the predetermined zone containing the data to be acquired. The preceding flow chart is applied for abscissa $X_0$ of the first point of the curve to be digitized. The processor performs a calculation of the ordinates. It then controls the positioning of the optoelectronic means in such a way that median cell 3 is centered on value $Y_0$, which in fact corresponds to the positioning of cell 3 on the curve. The "binary" word formed by the logic states of output signals $L_1, L_2, L_3$ of comparators 26, 27, 28 then has the binary configuration 0,1,0 representing the decimal value 2.

Figure 10:
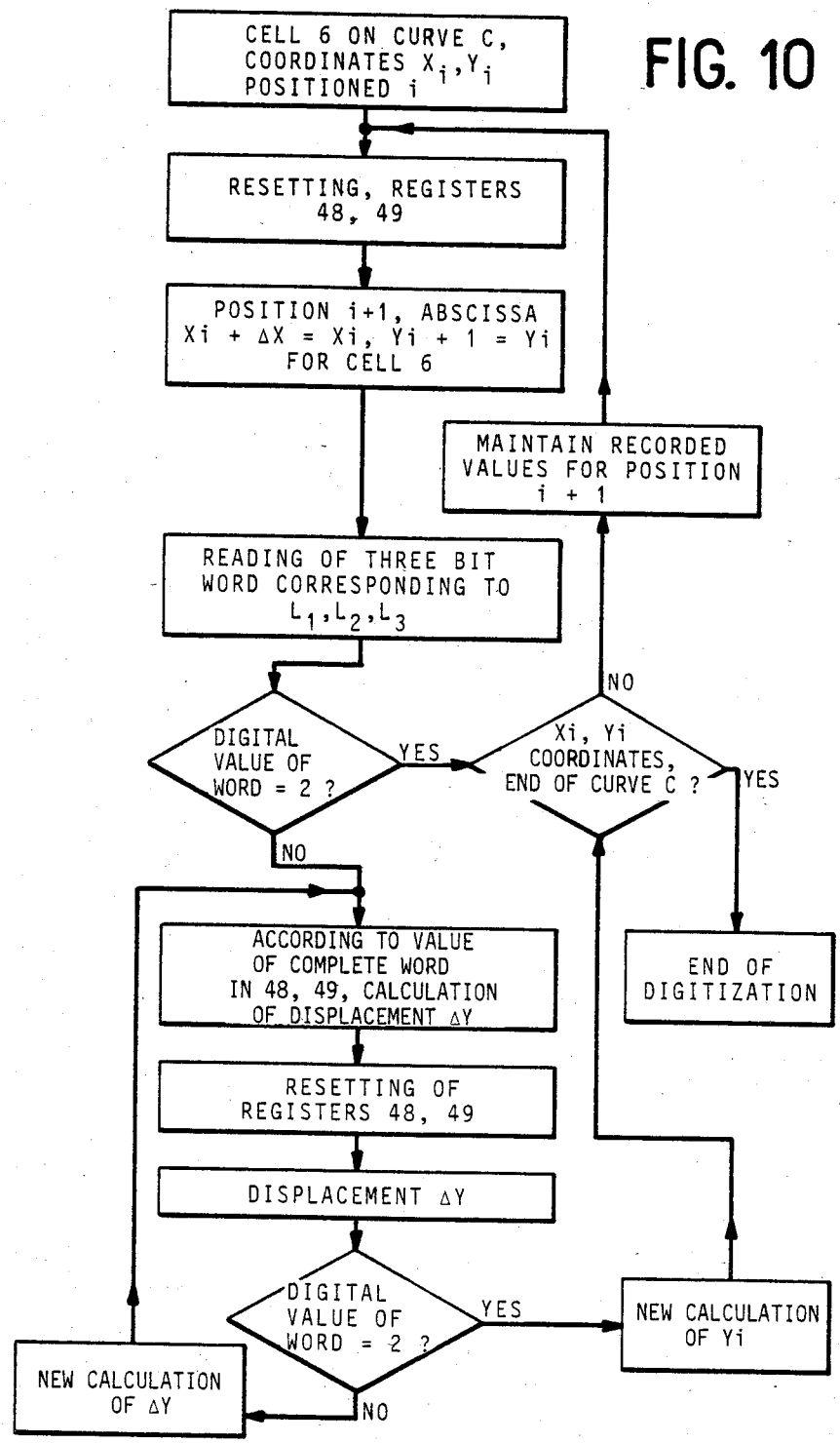
FIG. 10, a flow chart of the main operations performed by the system according to the invention during the acquisition of graphic data constituted by a curve.

The flow chart of FIG. 10 represents the investigation of the following points of the curve by analyzing the digital values read into registers 48 and 49. In this flow chart, it is considered that the step $\Delta X$ is initially fixed by the user. The optoelectronic means are then selected in such a way that the median cell 3 faces the curve. It is assumed that the coordinates of this median cell are initially $X_i$ and $Y_i$. The registers 48, 49 of coding means 29 are then reset by means of the signals $FL_1$ and $FL_2$, applied to latches 50, 51, 52. The optoelectronic means are then displaced in order occupy position $i+1$, in such a way that the abscissa of the median cell 3 corresponds to the value $X_{i+1}=X_i+\Delta X$. The processor then reads into registers 48, 49, the three-bit word corresponding to the logic states of signals $L_1, L_2, L_3$. The following operation consists of testing whether the digital value of the preceding word is equal to 2 (corresponding to the binary value 0,1,0, the median cell facing the curve).

If the answer to the word test is affirmative (yes) a check is made to establish whether the coordinates $X_i$ and $Y_i$ correspond to the coordinates of the end of the curve. If the answer to this check is in the affirmative (yes) the digitization of the graphic data is at an end. If the answer to this check is negative (no), the digital values recorded for position $i+1$ are maintained and the same operations are repeated, starting from the resetting of registers 48, 49.

If the digital value of the three-bit word corresponding to signals $L_1, L_2, L_3$ differs from 2 (answer no to the question: digital value of the word=23) as a function of the value of the complete word contained in the registers 48, 49 (word indicating the transitions undergone by signals $L_1, L_2, L_3$), logic signals are taken by the processor, which calculates the displacement to be performed, parallel to axis Y. The content of registers 48 and 49 is then reset, followed by a displacement $\Delta Y$ parallel to axis Y. The digital value of the word corresponding to the three bits representing signals $L_1, L_2, L_3$ is then tested. If this digital value is equal to 2 (answer yes to the question: digital value of the word=23), the processor calculates a new displacement parallel to axis Y, to bring the median cell into a new position $Y_i$. A check is then made, as hereinbefore, to establish whether the coordinates $X_i$, $X_i$ of this cell represent the end of curve coordinates.

However, if the answer to the question digital value of the word=2 is negative (no) this means that the displacement $\Delta Y$ which has been performed, has not enabled the median cell to be again positioned on the curve. The processor then calculates a new displacement $\Delta Y$ starting, as hereinbefore, from the value of the complete word contained in registers 48 and 49.

It has obviously been assumed, in the considered example, that the conditions were ideal and that the thickness of curve C is equal to or less than the distance between the two focusing points of the two cells. The software can be optimized by taking account of the slope of the curve and must make it possible to envisage more complex situations (thick curves, noise, cuspidal points, critical points, etc). These organic means clearly show the usefulness of the automatic resetting means (FIG. 4), which make it possible to lighten the software.

Figure 11:
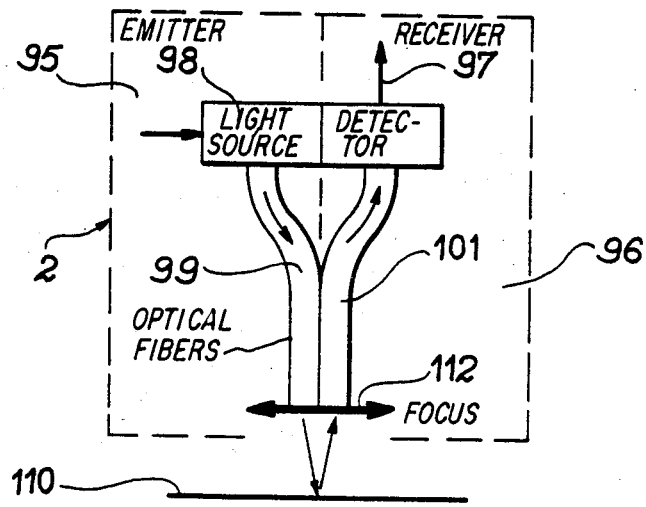
FIG. 11, diagrammatically, a first embodiment of the optoelectronic means used in the system according to the invention.

FIG. 11 diagrammatically shows a first embodiment of a photosensitive cell usable in the system according to the invention. According to this first embodiment, each photosensitive cell, such as e.g. cell 2, comprises an emitter 95 emitting electromagnetic radiation in the direction of a graphic data support 96 and a photosensitive receiver 96. This photosensitive receiver has an output 97, which is connected to an input of one of the output amplifiers shown in FIG. 1. In this embodiment, emitter 95 comprises a light source 98, illuminating an optical fibre 99, directed towards the area of the support containing the data to be acquired. Photosensitive receiver 96 comprises a photosensitive detector 100 and an optical fibre 101, supplying the detector with the electromagnetic radiation reflected on support 110. The focusing means are 112.

Figure 12:
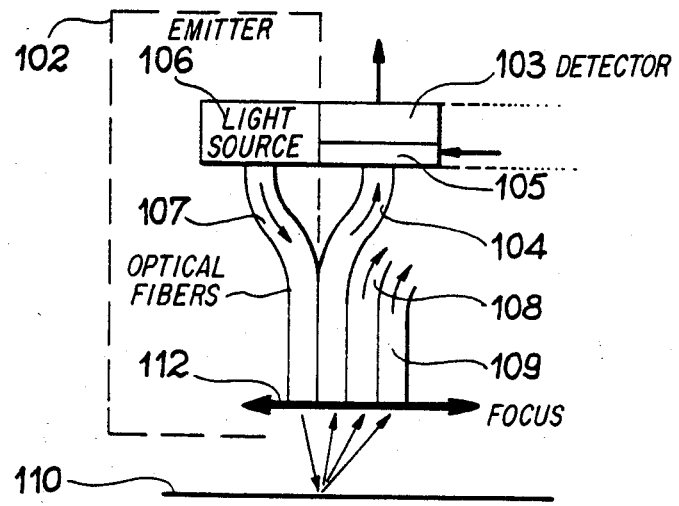
FIG. 12, diagrammatically, a second embodiment of the optoelectronic means used in the system according to the invention.

FIG. 12 diagrammatically shows another embodiment of the photosensitive cell used in the system according to the invention. In this embodiment, the photosensitive cells comprise a common white light radiation emitter 102, and three photosensitive receivers at the different wavelengths of said radiation. In FIG. 12, only one of the photosensitive receivers is shown. This receiver comprises a photosensitive detector 103 and an optical fibre 104 supplying the detector with the radiation reflected on support 110. Each detector 103 is associated with switchable filters 105. In this embodiment, the emitter comprises a white light source 106, illuminating an optical fibre 107, directed towards the area of the support 110 containing the data to be acquired. It is also possible to see fibres 108, 109, associated with the two other detectors of this photosensitive cell. The switchable optical filters make it possible then for the system according to the invention to acquire polychromatic data.

According to another embodiment which can be described with the aid of FIG. 11, emitter 98 can be an emitter selectively emitting radiation at different wavelengths. In this case, detector 100 is obviously sensitive to the different wavelengths of said radiation. For example, said emitter can be source 98, emitting by commutation or switching, radiation at different wavelengths. This source illuminates optical fibre 99, directed towards support 110. In this embodiment, the receiver is constituted by a detector 100 photosensitive to the different wavelengths emitted by the source, and by an optical fibre 101 supplying said detector with radiation reflected on support 96. It is obvious that in the two last-described embodiments, the switchable filters 105 or switchable source 98, can be controlled by processor 10 from instructions recorded in memory 11.

In these various embodiments, the optical fibres can be associated with focusing means 112, The accuracy of operation in the qualitative mode is linked with three essential factors, namely the dimensions of the figure created by the arrangement of the focusing points, themselves linked with the focusing accuracy of the detection means, and the absolute precision of the positioning means.

The operating precision in the quantitative mode is dependent on the knowledge and reliability of the transfer characteristics of the detection means (linearity and temperature coefficient). It is also dependent on a quantification factor chosen in the analog-digital conversion performed by converter 13. The system can be applied to spectrometry, photometry or densitometry of surfaces in a wide range of wavelengths. For example, it permits the analysis of photographs, X-ray photographs, X-ray diagrams and chromatograms. It can be used for determining the contours or for studying the granularity of surfaces.

What is claimed is:

1. A system for the acquisition of data inscribed on a support incorporating: detection means sensitive to the different electromagnetic, radiation intensities of predetermined wavelengths, coming from data inscribed on a support, said detection means supplying on outputs, analog signals whose amplitudes are respectively dependent on the radiation intensities; means for displacing the detection means at least in an area containing the data to be acquired, said displacement depending on the amplitude of said analog signals; control and processing means comprising a processor connected to the means for displacing the detection means and to a memory; analog-digital conversion means receiving the analog signals during the displacement of the detection means in order to supply at an output digital values corresponding respectively to the said amplitudes; the memory containing control instructions for the means for displacing the detection means relative to a fixed coordinate, as well as processing and addressing instructions for the digital values related to the coordinates of the data; wherein the analog-digital conversion means comprise an analog-digital converter, and programmable means for amplifying the amplitudes of the analog signals supplied to the analog-digital converter, said amplification being performed on the basis of a predetermined reference amplification amplitude, the gain of these amplification means being programmable by the processor and dependent on a desired scale of digital values at the output of the analog-digital converter; the system also comprising comparison means with logic outputs for comparing instantaneous values of said amplitudes of the analog signals with mean reference comparison amplitude values, during the displacement of the detection means, the outputs of said comparison means supplying a signal having states or logic state changes representing the instantaneous transitions of radiation intensities caused by the acquisition of data by the cells during their displacements; the detection means comprising at least one median photosensitive cell and two photosensitive cells on either side of the median cell; the reference amplification and comparison amplitudes being determined during a displacement of the cells permitting a prior scanning of the zone containing the data to be acquired; said detection means also comprising output amplifiers, inputs of these amplifiers being respectively connected to the outputs of the cells, outputs of said amplifiers respectively supplying the said analog signals; the reference amplification amplitude being determined by the processor from amplitudes of the analog signal supplied by the output amplifier corresponding to the median photosensitive cell, during the prior scanning; the mean reference comparison amplitudes being respectively determined by the processor, on the basis of the amplitudes of the signal respectively supplied by said output amplifier during the prior scanning.

2. A system according to claim 1, wherein the programmable amplification means comprise an analog multiplexer having inputs respectively connected to the outputs of the output amplifiers, one input of an analog comparator receiving a signal having said predetermined amplification reference amplitude, whilst another input of said comparator receives the analog signals supplied by the output amplifier of the median cell during displacements in the said zone, an amplifier having programmable gain determined by the processor, an input of said amplifier being connected to an output of the analog comparator, an output of said comparator being connected to an input of the multiplexer to switch the amplified signals corresponding to the median cell to the analog-digital converter.

3. A system according to claim 2, wherein the comparison means with logic outputs comprise, for each output amplifier, a digital-analog converter receiving on an input a reference digital comparison value supplied by the processor, said digital value corresponding to the mean reference comparison amplitude, for the analog signal supplied by the corresponding output amplifier, a comparator having two inputs, one input of said comparator being connected to the output of the corresponding digital-analog converter for receiving an analog signal, whose amplitude corresponds to the reference digital comparison value, another input of this comparator being connected to the output of the corresponding output amplifier, each comparator supplying on one output, a logic signal having two states representing the characteristic states of the intensities of the radiation emitted by the graphic data and detected by the corresponding cell, said states being detected during the acquisition of data and respectively indicating whether the amplitude of the signal supplied by the output amplifier of said cell is higher or lower than the reference mean comparison amplitude for each cell.

4. A system according to claim 3, wherein the system also comprises coding means having inputs connected to the outputs of the comparators for forming, during the acquisition of the data, words representing the instantaneous binary states of the outputs of the comparators and making it possible to mark the outputs of the comparators, whose signals undergo a binary state change, said words being supplied to the processor by the outputs of the coding means.

5. A system according to claim 4, wherein the coding means comprise at least one register, the outputs of this register forming the outputs of the coding means, inputs of this register being connected to the outputs of the comparators, and three bistable latches respectively having two control inputs, the inputs of the first, second and third of the said latches being respectively connected to the outputs of the first and second comparators, the first and third comparators, and the second and third comparators from among the three comparators of the comparison means.

6. A system according to claim 5, wherein the system also comprises at least one counter having an input connected to the output of the second comparator corresponding to the median cell for counting the number of logic state changes undergone by the output signal of said comparator during the acquisition of the data or during the prior scanning.

7. A system according to claim 6, wherein the outputs of this counter are connected to the processor via a register.

8. A system according to claim 7, wherein it also comprises means for addressing the multiplexer, the analog-digital converter, the programmable gain amplifier, digital-analog converters and registers.

9. A system according to claim 8, wherein it also comprises automatic resetting means having outputs connected to the control inputs of the latches and the counter, inputs of said resetting means being connected to the outputs of the addressing means.

10. A system according to claim 9, wherein each photosensitive cell comprises an electromagnetic radiation emitter and a photosensitive receiver having an output connected to an input of one of the output amplifiers.

11. A system according to claim 10, wherein the emitter comprises a light source illuminating an optical fibre towards the zone containing the data to be acquired, the photosensitive receiver incorporating a photosensitive detector and an optical fibre supplying to the detector electromagnetic radiation reflected on the zone containing the data to be acquired.

12. A system according to claim 9, wherein the photosensitive cells comprise a common white light radiation emitter and three receivers photosensitive to different wavelengths of said radiation.

13. A system according to claim 12, wherein the emitter comprises a white light radiation source illuminating an optical fibre directed towards the zone containing the data to be acquired, the receivers respectively comprising a photosensitive detector and an optical fibre feeding to the said detector, the radiation reflected on said zone, each detector being associated with switchable optical filters, respectively sensitive to the different wavelengths.

14. A system according to claim 13, wherein the memory connected to the processor also contains switching instructions for the filters.

15. A system according to claim 9, wherein the photosensitive cells comprise at least one common emitter able to selectively emit radiation at different wavelenths, and for each photosensitive cell a receiver sensitive to the different wavelengths and intensities of said radiation.

16. A system according to claim 15, wherein the common emitter comprises at least one source able to emit by switching radiation of different wavelengths, said source illuminating an optical fibre directed towards the zone containing the data to be acquired, each receiver comprising a photosensitive detector at the different wavelengths and an optical fibre supplying the detector with the radiation reflected on said zone.

17. A system according to claim 16, wherein the memory connected to the processor also contains switching instructions for the source.

18. A system according to any one of the claims 11, 13 and 16, wherein the optical fibres are associated with focusing means.

19. A system according to claim 9, wherein the memory connected to the processor also contains control instructions for the means for displacing the optoelectronic means as a function of the binary value words supplied to the processor by the coding means.

* * * * *